United States Patent
Ebersole et al.

(10) Patent No.: US 10,134,017 B1
(45) Date of Patent: Nov. 20, 2018

(54) METHOD AND SYSTEM FOR PERFORMING A FINANCIAL TRANSACTION USING A USER INTERFACE

(75) Inventors: Betsy Ebersole, Washington, DC (US); Julio Farach, Atlanta, GA (US); Jill Sorg, Richmond, VA (US); Donald Jeffery Smith, Richmond, VA (US); Hector Crespo, Frisco, TX (US); Lynn Jackson, Denton, TX (US)

(73) Assignee: Capital One Services, LLC, McLean, VA (US)

( * ) Notice: Subject to any disclaimer, the term of this patent is extended or adjusted under 35 U.S.C. 154(b) by 942 days.

(21) Appl. No.: 12/875,318

(22) Filed: Sep. 3, 2010

Related U.S. Application Data

(63) Continuation of application No. 11/857,609, filed on Sep. 19, 2007, now Pat. No. 7,792,748.

(51) Int. Cl.
*G06Q 20/10* (2012.01)
*G06Q 40/02* (2012.01)

(52) U.S. Cl.
CPC .......... *G06Q 20/108* (2013.01); *G06Q 40/02* (2013.01)

(58) Field of Classification Search
CPC ...... G06Q 20/10; G06Q 20/108; G06Q 20/02; G06Q 20/40; G06Q 20/401; G06Q 20/402; G06Q 40/02; G06Q 10/02
USPC ........................................ 705/26.1, 26.8, 39
See application file for complete search history.

(56) References Cited

U.S. PATENT DOCUMENTS

| 5,864,830 | A |   | 1/1999 | Armetta et al. |
|---|---|---|---|---|
| 5,883,810 | A | * | 3/1999 | Franklin et al. ............. 700/232 |
| 5,953,710 | A |   | 9/1999 | Fleming |
| 6,131,810 | A |   | 10/2000 | Weiss et al. |
| 6,327,573 | B1 |   | 12/2001 | Walker et al. |
| 6,354,490 | B1 |   | 3/2002 | Weiss et al. |
| 7,567,934 | B2 | * | 7/2009 | Flitcroft et al. ................ 705/37 |
| 2001/0034720 | A1 | * | 10/2001 | Armes ........................... 705/65 |
| 2002/0069122 | A1 | * | 6/2002 | Yun ........................ G06Q 30/06 705/26.1 |
| 2002/0091635 | A1 | * | 7/2002 | Dilip ...................... G06Q 20/10 705/39 |
| 2003/0009402 | A1 |   | 1/2003 | Mullen et al. |
| 2004/0093281 | A1 | * | 5/2004 | Silverstein et al. ............ 705/26 |
| 2004/0211830 | A1 |   | 10/2004 | Algiene |
| 2005/0010483 | A1 |   | 1/2005 | Ling |
| 2005/0080697 | A1 |   | 4/2005 | Foss, Jr. |
| 2005/0098624 | A1 |   | 5/2005 | Foss, Jr. |

(Continued)

OTHER PUBLICATIONS

GlobeID: Server-side digital wallet from GlobeID, @PayIssuer addresses card issuers' competitive challenges and empowers cardholders M2 Presswire. Coventry: Jan. 27, 2000, p. 1.

*Primary Examiner* — Christine M Behncke
*Assistant Examiner* — Gerald C Vizvary
(74) *Attorney, Agent, or Firm* — Troutman Sanders LLP; Christopher J. Forstner; John A. Morrissett

(57) ABSTRACT

A system and method for performing a financial transaction by determining a master account number associated with one or more accounts that a user may access, providing data to generate a user interface displaying a list of the accounts and an indicator associated with a financial transaction, receiving indicator information associating the indicator with one or more of the accounts, receiving terms for the financial transaction, and performing the financial transaction. The list of accounts may be expanded to view account information.

21 Claims, 6 Drawing Sheets

(56) References Cited

U.S. PATENT DOCUMENTS

| | | |
|---|---|---|
| 2005/0203836 A1 | 9/2005 | Woodward et al. |
| 2005/0222957 A1 | 10/2005 | Understein |
| 2006/0020538 A1 | 1/2006 | Ram |
| 2006/0064378 A1* | 3/2006 | Clementz et al. ............... 705/40 |
| 2007/0119921 A1* | 5/2007 | Hogg et al. ................... 235/380 |
| 2008/0228637 A1* | 9/2008 | Scipioni et al. ................ 705/39 |
| 2008/0228638 A1 | 9/2008 | Scipioni et al. |
| 2011/0314413 A1* | 12/2011 | Kunkler et al. .............. 715/781 |

\* cited by examiner

METHOD AND SYSTEM FOR PERFORMING A FINANCIAL TRANSACTION USING A USER INTERFACE

CROSS REFERENCE

This application claims priority to pending application Ser. No. 11/857,609, filed Sep. 19, 2007, the contents of which are hereby incorporated by reference.

FIELD OF THE INVENTION

The present invention relates to a method and system for performing a financial transaction using a user interface.

BACKGROUND OF THE INVENTION

Managing multiple bank accounts at multiple financial institutions may be confusing for customers as they have to remember contact information for all of their banks. It may also be difficult to manage multiple accounts with one bank as customers can get the account numbers confused. Additionally, having multiple accounts at multiple banks may lead to a very slow money transfer process.

These and other drawbacks exist with current systems.

SUMMARY OF THE INVENTION

Various exemplary embodiments provide a method for a user to access his or her accounts held at multiple financial institutions and instantly transfer money between them via an interactive user interface. The entity providing the user interface may maintain the user's individual accounts and account numbers on the "back end" and at the same time allow the user to access a set of accounts with only one overall, master account number. In that way, one account number is all the user needs to remember to access his or her accounts and perform transactions involving the accounts, such as transferring money from one account to another, for example. The interactive user interface may present information to the user in an easy-to-use and visually appealing format. For example, the user interface may display visual representations of accounts and allow the user to visually move money between the accounts using an interactive device, such as a computer mouse, light pen, touch screen, or other mechanism. Upon doing so, the entity providing the user interface may instantly transfer funds as requested by the user. The user interface may dynamically change in response to user inputs to show more or less information in various formats. The entity providing the user interface may also intelligently respond to transaction requests by, for example, ensuring overdraft protection for the user's accounts.

Various exemplary embodiments may provide a method for performing a financial transaction including receiving identifying information associated with a user, determining a master account number based on the identifying information, providing data to be used in generating a user interface, receiving indicator information reflecting an association between an indicator and one or more accounts, receiving terms for a financial transaction, and performing the financial transaction. The master account number may be associated with a set of accounts that the user can access. The user interface may display a list of such accounts, associate an indicator with a financial transaction, and display the indicator on the user interface. The indicator may represent the user's desire to perform a specific transaction, such as transferring money between accounts.

Various exemplary embodiments may also provide a system including a receiving module for receiving identifying information associated with a user, a processing module for determining a master account number based on the identifying information, an interface module for providing data to be used in generating a user interface, a communication module for receiving indicator information reflecting an association between an indicator and one or more accounts and for receiving terms for a financial transaction, and a transaction processing module for performing a financial transaction. The master account number may be associated with a set of accounts that the user can access. The user interface may display a list of such accounts, associate an indicator with a financial transaction, and display the indicator on the user interface. The indicator may represent the user's desire to perform a specific transaction, such as transferring money between accounts.

Various exemplary embodiments may also provide software for transmitting identifying information associated with a user, displaying a user interface, transmitting indicator information reflecting an association between an indicator and one or more accounts, and transmitting terms for a financial transaction. The user interface may display a list of accounts that the user can access based on a master account number associated with the accounts. The user interface may also display an indicator associated with a financial transaction. The indicator may represent the user's desire to perform a specific transaction, such as transferring money between accounts.

Various exemplary embodiments may provide a method for performing a financial transaction including providing identifying information associated with a user, receiving data to be used in generating a user interface, providing indicator information reflecting an association between an indicator and one or more accounts, and providing terms for a financial transaction. A master account number may be associated with a set of accounts that the user can access. The user interface may display a list of such accounts, associate an indicator with a financial transaction, and display the indicator on the user interface. The indicator may represent the user's desire to perform a specific transaction, such as transferring money between accounts.

Various exemplary embodiments may also provide a system including a transmission module for providing identifying information associated with a user, an interface module for receiving data to be used in generating a user interface, and a communication module for providing indicator information reflecting an association between an indicator and one or more accounts and for providing terms for a financial transaction. A master account number may be associated with a set of accounts that the user can access. The user interface may display a list of such accounts, associate an indicator with a financial transaction, and display the indicator on the user interface. The indicator may represent the user's desire to perform a specific transaction, such as transferring money between accounts.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENT(S)

The following description is intended to convey a thorough understanding of the embodiments described by providing a number of specific embodiments and details involving systems and methods for performing a financial transaction using a user interface. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for performing a financial transaction using a user interface.

Figure 1:
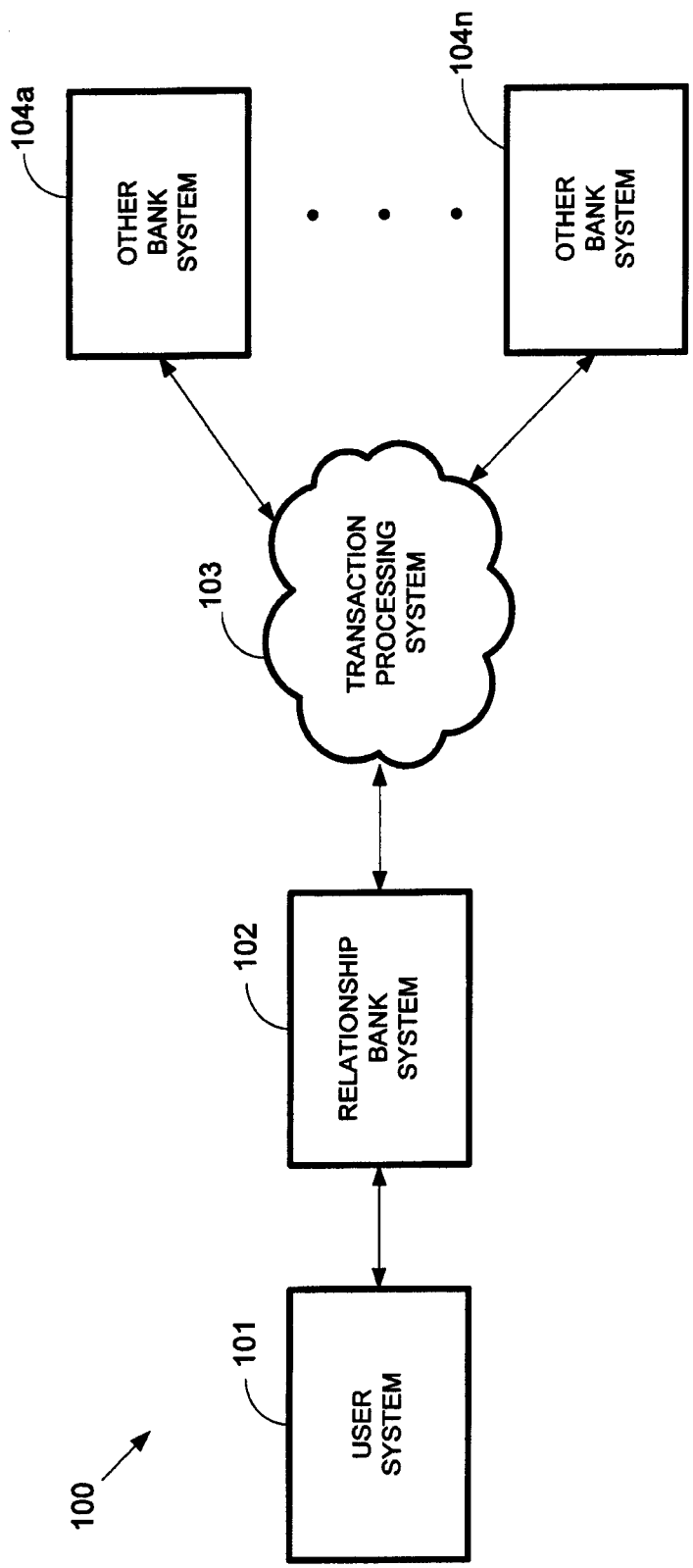
FIG. 1 depicts a schematic of a system and flow of data for performing a financial transaction according to various embodiments of the disclosure.

FIG. 1 depicts an exemplary embodiment of a system 100 for performing a financial transaction. As used herein, the term account may include any place, location, object, entity, or other mechanism for holding money in any form, including, without limitation, electronic form. System 100 may include a user system 101, a relationship bank system 102, a transaction processing system 103, and other bank systems 104*a*-104*n*.

The components depicted in FIG. 1 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In exemplary embodiments, the network may include one, or any number of the exemplary types of networks mentioned above operating as a stand-alone network or in cooperation with each other. Use of the term network herein is not intended to limit the network to a single network.

User system 101 may be associated with any individual or entity that desires to perform a financial transaction. In various exemplary embodiments, a financial transaction may include, for example, credit and/or debit transactions, cash consolidation transactions, and any other transactions involving money in any form, including, without limitation, transferring funds between accounts, paying a bill, opening a new account, establishing a direct deposit, establishing an automatic debit, deleting an account, setting an account alert, or setting an overdraft parameter, as will be explained in further detail below.

Exemplary users may include without limitation: a financial institution (e.g., a bank), a customer, a biller, an online bill paying customer, an online bill paying entity, an employer, an employee, a company, or other like entity for transferring money. User system 101 may include one or more network-enabled computers to process instructions for performing a financial transaction. As referred to herein, a network-enabled computer may include, but is not limited to: e.g., any computer device, or communications device including, e.g., a personal computer (PC), a workstation, a mobile device, a phone, a handheld PC, a personal digital assistant (PDA), a thin client, a fat client, a network appliance, an Internet browser, a server, or other device.

The one or more network-enabled computers of user system 101 may execute one or more software applications to, for example, receive instructions as input from a user accessing the network-enabled computer, process instructions received from a user, transmit data over a network, and receive data over a network. The one or more network-enabled computers may also include one or more software applications to enable the execution of a financial transaction.

Relationship bank system 102 may be associated with any bank with which the user has or desires to have a relationship. It should be recognized, however, that the relationship bank may be any type of financial institution or other similar entity and is not limited to commercial banks in particular. In various exemplary embodiments, a user associated with user system 101 and a relationship bank associated with relationship bank system 102 may have a predefined relationship for enabling the performance of a financial transaction. The user may, for example, have one or more accounts at the relationship bank where the user stores money. Also, a user may establish a relationship with a relationship bank for the first time by communicating with relationship bank system 102 through user system 101.

Relationship bank system 102 may include one or more network-enabled computers to process instructions for performing a financial transaction. The one or more network-enabled computers of relationship bank system 102 may execute one or more software applications to enable the performance of a financial transaction, such as, for example, transferring funds between accounts, paying a bill, opening a new account, establishing a direct deposit, establishing an automatic debit, deleting an account, setting an account alert, or setting an overdraft parameter, as will be described in greater detail below.

It should be understood that the methods and systems described herein are not limited to one user system 101 and one relationship bank system 102. Multiple users each associated with a user system 101 may interact with multiple banks each associated with a relationship bank system 102 to perform a financial transaction.

In various exemplary embodiments, a financial transaction may involve other bank systems 104*a*-104*n*, which may be associated with respective other banks that may also hold accounts. In the example illustrated in FIG. 1, a user associated with user system 101 and other banks associated with other bank systems 104*a*-104*n* may not have a predefined relationship for enabling the performance of a financial transaction.

Other bank systems 104*a*-104*n* may include one or more network-enabled computers to process instructions for performing a financial transaction, such as transferring money between accounts, via, for example, a transaction processing system, as described in greater detail below. The one or more network-enabled computers of other bank systems 104a-104n may execute one or more software applications to, for example, receive instructions for performing a financial transaction and process the transaction.

Transaction processing system 103 may be associated with, for example, a clearinghouse entity or an internal processor associated with the relationship bank. In various exemplary embodiments, a clearinghouse entity may include without limitation: an ACH clearinghouse (e.g., the Electronic Payments Network and/or the Federal Reserve Bank clearinghouse) and/or any other like entity capable of serving as a clearinghouse for financial transactions (e.g., a proprietary clearinghouse). In such embodiments, the other banks associated with other bank systems 104a-104n may each hold a financial account with transaction processing system 103 to enable the performance of a financial transaction. Relationship bank system 102 may also, for example, include an internal system to enable the same-day processing of transactions involving other bank systems 104a-104n.

The system 100 may be a browser-based system wherein a server executing in association with relationship bank system 102 or in communication with relationship bank system 102 may send data to user system 101 for rendering data to the user in a web browser program. Examples of commercial web browser programs suitable for this purpose are Internet Explorer available from Microsoft® Corporation, Netscape Navigator available from Netscape® Communications, Safari® available from Apple®, Inc., and Firefox® available from Mozilla Corporation. The user may execute the web browser program on user system 101 to connect to the server (e.g., via the Internet) and request the Uniform Resource Locator (URL) of a web page from the server. The server may ensure the user's security by, for example, requiring the user to authenticate himself or herself (e.g., with a username and password) prior to allowing the user to connect to the server. The server and web browser may also encrypt transmissions between them according to various known methods. The server may receive the user's request, process the request, retrieve or create the requested web page, and transmit the requested web page to user system 101. The user's web browser program may then receive the web page and render it on the user's computer screen. The user may then interact with the web page by, for example, clicking on buttons or links associated with the web page, entering information with a keyboard, or dragging and dropping items displayed on the web page. The web browser may interpret this interaction and send instructions to the server to perform a desired financial transaction.

The web pages described above may be, for example, HTML (Hypertext Markup Language), XML (Extensible Markup Language), ASP (Active Server Page), Java, Javascript, XHTML (Extensible HyperText Markup Language), or Ajax (Asynchronous JavaScript and XML) files, or any other file format that allows web pages or portions of web pages to be rendered in a web browser. It will be recognized by those skilled in the art that various tools are readily available to create and render web pages.

Figure 2:
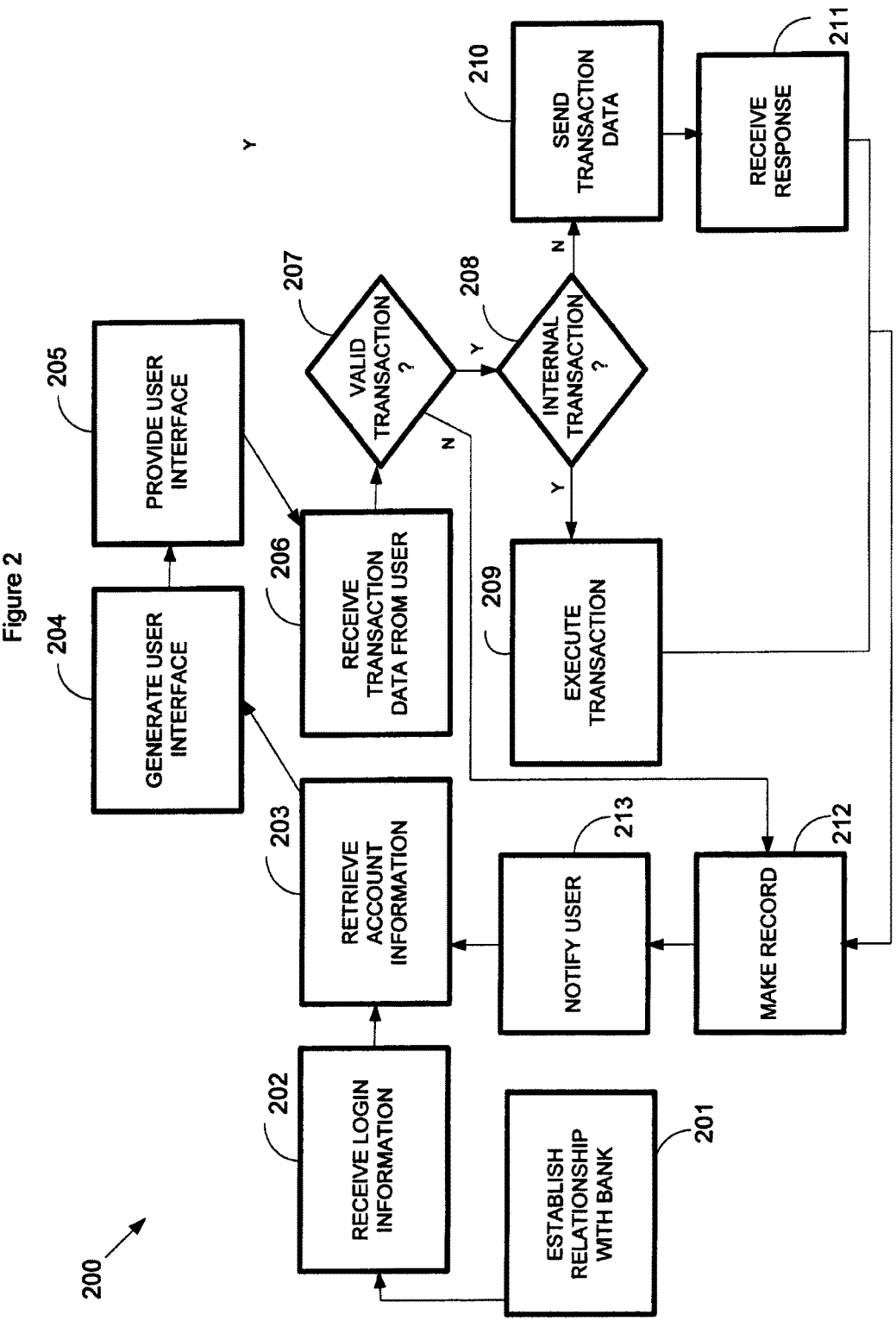
FIG. 2 depicts an exemplary method for performing a financial transaction according to various embodiments of the disclosure.

FIG. 2 depicts an exemplary flow chart 200 which illustrates an exemplary method for performing a financial transaction.

In block 201, a user may establish a relationship with a relationship bank. The user may establish the relationship in any way, such as, for example, in person, online, or over the telephone. The user may establish a relationship with a relationship bank by establishing one or more accounts with the relationship bank to hold the user's money. The user may create an unlimited number of accounts of various known types. For example, the account may be a deposit account, checking account, savings account, money market account, individual retirement account (IRA), Roth individual retirement account (Roth IRA), 401k account, investment account, or any combination of any of the above. The user may also make an initial deposit into the account by providing money in any form (e.g., cash, check, cashier's check, money order, certificate of deposit (CD), stock certificate, bond certificate, mutual fund certificate, promissory note, option, online transfer, ACH transfer, etc.) to the relationship bank.

Also, the account may be any investment account to hold financial investments, such as CDs, stocks, bonds, and mutual funds.

The account may also be any account from which the user can transfer money or receive a loan, such as, for example, a credit card account, debit card account, rewards account, or line of credit account.

In an exemplary embodiment, the user may establish an account by providing the relationship bank with information for another account held at another bank. For example, the user may provide information, such as the name, address, account name or number, and routing information, for an account that the user holds at another bank. The relationship bank may verify with the other bank what transfers, if any, are permitted to and from the user's account at the other bank prior to establishing the account at the relationship bank.

The user may also establish an account by providing the relationship bank with information for paying a bill to any entity, including the relationship bank. For example, the user may provide information, such as the name, address, account name or number, and routing information, associated with a debt obligation to an entity that loaned money to the user (e.g., car loan provider, home mortgage provider, student loan provider). The user may also provide information, such as the name, address, account name or number, and routing information, for any other entity to which the user owes payment (e.g., electric company, water company, gas company, cable company, Internet connection provider, credit card provider, etc.). The relationship bank may verify with such entity what transfers, if any, are permitted to and from the entity prior to establishing the account at the relationship bank.

The user (e.g., a parent, child, business owner, employer) may also establish an account to hold money for another individual or entity. For example, a parent may establish a checking account for his or her child, or a business owner may establish an account for his or her spouse, or an employer may establish accounts for its employees or other persons associated with the company. The relationship bank may then allow all such individuals or entities to perform financial transactions, such as transferring money to and from the account. Also, the relationship bank may only give permission to certain individuals or entities or may give those individuals or entities permission to perform only certain specified financial transactions.

The user may also establish a relationship with the relationship bank but choose to open one or more accounts at a later date. The relationship bank may allow the user to open a new account by selecting from a list of predetermined accounts tailored to the respective user.

In various exemplary embodiments, the relationship bank may associate an identifier (e.g., an account number) with each account established by the user. The identifier may be any sequence of letters, numbers, or characters of any length. The identifier may be used by the relationship bank to transfer funds to and from the associated account. Also, the relationship bank may establish one account to hold funds for the user and multiple virtual accounts each associated with particular portions of funds held in the account. The relationship bank may associate identifiers with the account and/or with the associated virtual accounts. The virtual accounts may operate in the same way as the accounts described herein.

The relationship bank may also establish a master account number associated with a set of accounts that the user may access. The master account number may be any sequence of letters, numbers, or characters of any length. Using a master account number rather than a set of individual account numbers may make it easier for the user and relationship bank to keep track of multiple accounts. A user may have multiple master account numbers each associated with a respective set of accounts that the user may access. For example, a user may have a set of accounts for business use and another set of accounts for personal use. A master account number may also be associated with a set of accounts to which multiple users have access.

In various exemplary embodiments, any type of restriction or benefit may also be placed on any account set up by a user. For example, for a short-term savings account with a low interest rate, the relationship bank may allow the user to transfer any amount of money to and from the account at any time. Whereas for a long-term savings account with a high interest rate, the relationship bank may only allow the user to transfer money at designated intervals (e.g., once per month) or in designated amounts (e.g., $100 at a time). The relationship bank may offer accounts with predetermined restrictions or benefits. The user may also set his or her own restrictions or benefits for an account. For example, the user may specify that his or her child should be given equal, greater, or restricted access to an account or may, for example, restrict the child from withdrawing no more than a set amount of money from an account per month. The restrictions and benefits for an account may be modified and/or changed over time, either automatically or after authorization by the relationship bank or user, based on activity within the account. For example, when an account's balance reaches a predetermined amount, such as $10,000, it may be upgraded to an "elite" or "premium" high-yield account with a higher interest rate and various new, additional, or other transfer restrictions. The relationship bank may also notify the user when he or she becomes eligible for an upgrade or subject to a downgrade.

In various exemplary embodiments, the relationship bank may provide the user with a master account number or any other information to identify a set of accounts that the user may access. The user may also choose his or her own identifying information (e.g., username and password), which the relationship bank may, for example, associate with a master account number. The relationship bank may store account numbers, master account numbers, the user's identifying information, or any information provided by the user to establish the relationship with the relationship bank, any restrictions or benefits placed on each account, and any other information associated with the user or his or her accounts in an electronic storage medium. It is well-known in the art that electronic files and documents may be stored in various ways, including, for example, a flat file, indexed file, hierarchical database, relational database, such as a database created and maintained with software from Oracle® Corporation, Microsoft® Excel file, Microsoft® Access file, or any other storage mechanism.

At block 202, the relationship bank may receive login information from the user, such as, for example, a username and password. The user may also provide a master account number to the relationship bank. To login, the user may enter his or her login information or a master account number into a login page served by the relationship bank.

At block 203, the relationship bank may retrieve data from an electronic storage medium to build a user interface for the respective user based on a master account number. In an exemplary embodiment, the data may include a list of accounts associated with the master account number that the user may access, information about each account (e.g., balance, interest rate, restrictions, benefits), as well as any type of web page functionality (e.g., text boxes, radio buttons, images, icons, drop-down menus) necessary to render a web page as a user interface. The data may also include any parameters set by the user for customizing his or her own user interface. The user may, for example, create categories and subcategories, change the color of the screen, change the size of text, images, and icons, or change how items are arranged on the screen, as described in greater detail below. The data may also include indicators representing a user's desire to perform a particular financial transaction that may be displayed on the user interface. The user may interact with the indicators by, as just one example, dragging and dropping them from one location on the screen to another, as discussed in greater detail below.

At block 204, the relationship bank may generate the user interface based on the information that was retrieved. In an exemplary embodiment, the relationship bank may generate a web page that can be rendered by a web browser.

Figure 3:
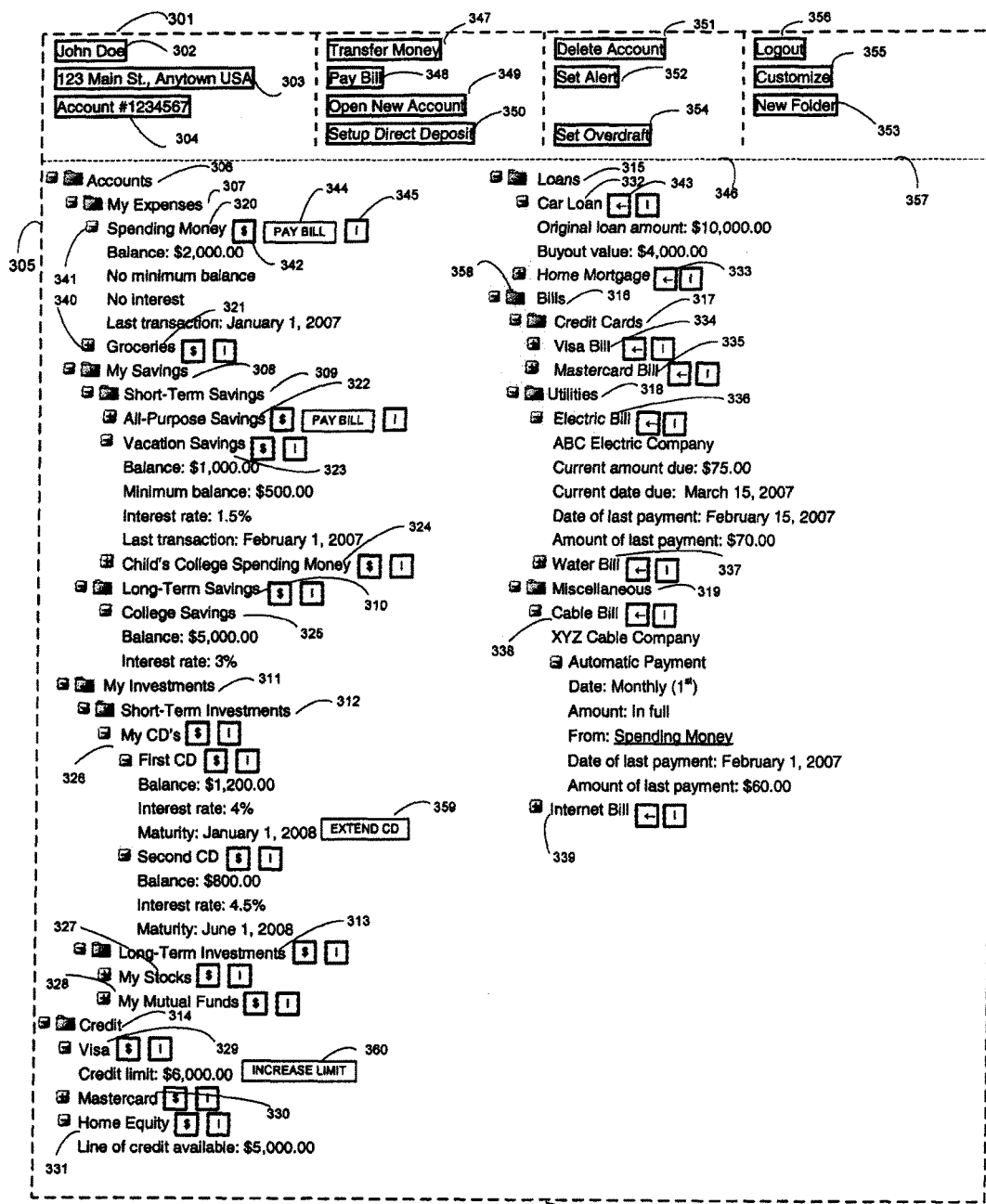
FIG. 3 depicts an exemplary user interface for performing a financial transaction according to various embodiments of the disclosure.

At block 205, the relationship bank may provide the user interface to the user. To provide the user interface, the relationship bank may transmit a web page to the user's web browser for display on the user's computer screen. The user interface may include functionality for the user to initiate a financial transaction, as shown in FIG. 3 and discussed in greater detail below.

At block 206, the relationship bank may receive data transmitted by the user to initiate a desired financial transaction. The data may include, for example, the account name or number from which money is to be withdrawn, the account name or number from which money is to be sent, the amount of money to be transferred, the date of the transfer, or any other information associated with the desired transaction. The data may also be associated with the user's interaction via indicators displayed on the user interface. For example, to initiate the transfer of money between accounts, the user may associate an indicator for transferring money with a first account from which money is to be transferred and a second account to which money is to be transferred.

At block 207, the relationship bank may determine if the desired transaction is valid by comparing the received data to the information associated with the account(s) specified by the user (e.g., balance, interest rate, restrictions, benefits). If the transaction is valid, the system may proceed to block 208. If the transaction is not valid, the system may proceed to make a record of the invalid transaction at block 212, notify the user that the desired transaction could not be completed at block 213, and provide the user interface to the user again in blocks 203, 204, and 205. For example, if the user desired to transfer $1000 from one account to another, but the first account's balance was only $500, the transaction may not be allowed. If the first account had a restriction placed on it by the user or the relationship bank whereby only $500 could be transferred at a time, the transaction may also not be allowed. At block 213, the user interface may indicate to the user that the desired transaction could not be completed and the reasons why the transaction could not be completed through a pop-up window, text box, or other notification on a web page. The relationship bank may also suggest alternative transactions for the user by, for example, displaying them on a web page.

At block 208, the relationship bank may determine whether the desired transaction can be completed via processing at the relationship bank. It will be recognized by those in the art that transactions that can be completed at one bank require less processing than transactions that require communicating with another bank or other entity via, for example, the use of an ACH clearinghouse as described above, and/or external processing by another bank or other entity. If the desired transaction can be completed at the relationship bank, the relationship bank may proceed to execute the transaction at block 209, make a record of the executed transaction at block 212, notify the user that the desired transaction was executed at block 213, and provide the user interface to the user again at blocks 203, 204, and 205. For example, the user may desire to transfer money from his or her savings account held at the relationship bank to his or her checking account held at the relationship bank, which can be executed completely internally at the relationship bank. The user interface may indicate to the user that the desired transaction was completed at block 213 through a pop-up window, text box, or other notification on a web page.

If, however, the desired transaction requires processing by a bank or entity other than the relationship bank, the relationship bank may send data associated with the desired transaction to the other bank or entity at block 210. For example, the user may desire to transfer $100 from his or her savings account to his or her electric company to pay a bill. The user may also desire to transfer an investment, such as a CD or stock, to his or her child's account at another bank. The user may also desire to transfer an investment that the user holds at another bank to one of his or her accounts at the relationship bank. The user may also desire to open a new account at another bank and transfer some of his or her savings there. The other bank or entity may respond by indicating whether the transaction was completed. The relationship bank may receive the response at block 211. If the transaction was completed, the relationship bank may proceed to make a record of the executed transaction at block 212, notify the user that the desired transaction was executed at block 213, and provide the user interface to the user again at blocks 203, 204, and 205. If the transaction was not completed for any reason, the relationship bank may proceed to make a record of the unexecuted transaction at block 212, notify the user that the desired transaction could not be completed at block 213, and provide the user interface to the user again at blocks 203, 204, and 205. At block 213, the user interface may indicate to the user that the desired transaction could not be completed and the reasons why the transaction could not be completed through a pop-up window, text box, or other notification on a web page. The relationship bank may suggest alternative transactions for the user by, for example, displaying them on a web page.

To make a record of the transaction, the relationship bank may enter data associated with the executed or unexecuted transaction into a database. Such data may later be processed by the relationship bank for such purposes as transaction monitoring and quality assurance. The relationship bank may also provide data associated with prior transactions to a user in an easy-to-view format by retrieving such data from the database and displaying it to the user via a user interface.

To notify the user regarding the status of the transaction, the relationship bank may provide a pop-up window, text box, or other notification on a web page, or may notify the user with, for example, a telephone message, fax message, e-mail, text message, or instant message.

The process shown in FIG. 2 may continue until the user exits the user interface. For example, the user may click on a button labeled "Log Out" on a web page and/or receive a message that the user session has been terminated due to inactivity.

FIG. 3 depicts an exemplary user interface 300 for performing a financial transaction according to various embodiments of the disclosure. As described above, user interface 300 may, for example, be displayed on a network-enabled computer, such as a PC, mobile device, or automated teller machine (ATM). Exemplary user interface 300 may display one or more accounts organized into a hierarchical folder-type structure. In various exemplary embodiments, exemplary user interface 300 may include one or more of the following: a heading 301, a body 305, a set of indicators 346, and/or a set of user interface tools 357. It will be recognized by those in the art, however, that a user interface may be created and rendered in many different ways and the user interface discussed herein is not limited to exemplary user interface 300 described in reference to FIG. 3.

User interface 300 may display a heading 301, which may include, for example, the user's name 302, address 303, and master account number 304, which, as described above, may be associated with a set of accounts to which the user has access. The user interface may also include other information associated with the user, such as the user's Social Security Number, phone number, username, password, or the date when the user established a relationship with the bank.

In various exemplary embodiments, user interface 300 may display below heading 301 a body 305, which may include information associated with each of the one or more accounts to which the user has access. Body 305 may be organized into various categories and subcategories associated with those categories, such as "Accounts" 306, "My Expenses" 307, "My Savings" 308, "Short-Term Savings" 309, "Long-Term Savings" 310, "My Investments" 311, "Short-Term Investments" 312, "Long-Term Investments" 313, "Credit" 314, "Loans" 315, "Bills" 316, "Credit Cards" 317, "Utilities" 318, and "Miscellaneous" 319, as shown in FIG. 3. For example, subcategory "Credit Cards" 317 may be associated with category "Bills" 316. Categories and subcategories may also be each associated with a navigational tool, such as, for example, a folder icon 358, so that the user knows that the associated category is for organization only and not an account for transferring money.

User interface 300 may also display a list of accounts associated with the respective master account number within the aforementioned categories and subcategories. For example, user interface 300 may display the following accounts: "Spending Money" 320, "Groceries" 321, "All-Purpose Savings" 322, "Vacation Savings" 323, "Child's College Spending Money" 324, "College Savings" 325, "My CDs" 326," "My Stocks" 327, "My Mutual Funds" 328, "Visa" 329, "MasterCard" 330, "Home Equity" 331, "Car Loan" 332, "Home Mortgage" 333, "Visa Bill" 334, "MasterCard Bill" 335, "Electric Bill" 336, "Water Bill" 337, "Cable Bill" 338, and "Internet Bill" 339. For example, account 320 called "Spending Money" may be associated with the category "Accounts" 306 and subcategory "My Expenses" 307, while account 336 called "Electric Bill" may be associated with the category "Bills" 316" and subcategory "Utilities" 318. Having multiple accounts in a category or subcategory may assist the user in budgeting for particular purposes (e.g., "Groceries" account 321).

As described above, the relationship bank may treat the accounts established by the user as individual accounts to hold funds or as virtual accounts each associated with portions of funds held in a particular account. The relationship bank may associate identifiers with the particular account and/or the associated virtual accounts.

The accounts may each be displayed as or associated with a navigational tool, such as, for example, an image or icon, so that the user knows that the associated account name is a designation for an account. The user interface may display different images or icons for different types of accounts, which may be chosen by the user, the relationship bank, or any other entity. For example, a credit card account such as "Visa" account 329 may be associated with an image of a credit card, while a vehicle loan account such as "Car Loan" account 332 may be associated with an image of a car. Also, a savings account such as "Vacation Savings" account 323 may be associated with an image of a bucket that changes over time depending on how much money is held in the account. The user may specify a particular amount to indicate when the account is "full," such as $2000.00, and the image of the bucket may gradually fill as money is deposited. In that way, the user may be able to see how close they are to reaching their savings goal. The accounts may also be displayed as a navigational tool themselves without an associated name.

To make the user interface easier for the user to use and understand, the user interface may display names rather than account numbers, as shown in exemplary user interface 300. In that way, the user need not remember multiple account numbers and multiple financial institutions. The user interface may, however, allow the user to access account numbers for each of the accounts displayed on the user interface via, for example, a button, hyperlink, pop-up window, or other notification on a web page.

In an exemplary embodiment, the accounts from which the user may customarily transfer money may be listed first, followed by the accounts to which the user may customarily transfer money. Doing so may provide the user with a visual representation of transferring funds from top to bottom or from left to right that is easier to understand. Also, the relationship bank may modify the user interface associated with a particular user over time in accordance with how the user typically interacts with the user interface. For example, if a customer initiates transactions involving a particular account three times in a row, the user interface may display that account at the top of the screen. Such modifications may make it easier for the user to navigate and interact with the user interface.

In various exemplary embodiments, the user may also create an unlimited number of categories, subcategories, and accounts, associate or name them with any combination of characters, numbers, symbols, or navigational tools, and associate any type of navigational tool with any type of account. The relationship bank may name the categories, subcategories, and accounts, or may provide predetermined categories, subcategories, accounts, or navigational tools for the user to use.

In various exemplary embodiments, a category that has one or more associated subcategories, or a category or subcategory with one or more associated accounts, or an account with associated account information (e.g., balance, interest rate, maturity, last transaction), or a portion, constituent part, or other aspect of associated account information, may also be associated with a navigational tool to allow the user to dynamically expand or contract the category. For example, the navigational tool may be a "+" or "−" icon. When a category, subcategory, account, or account information is collapsed, the icon may appear as a "+", such as icon 340. The user may click on the "+" icon with the user's computer mouse to expand the field. The field may also be expanded whenever the user moves the user's computer mouse pointer over the "+" icon. When a category, subcategory, account, or account information is expanded, the icon may appear as a "−", such as icon 341. The user may click on the "−" icon with the user's computer mouse to collapse the field. The field may also be collapsed whenever the user moves the user's computer mouse pointer over the "−" icon.

In various exemplary embodiments, whenever a user uses such a navigational tool to expand an account, the user interface may display account information associated with the respective account, which may be tailored to the particular type of account. For example, in exemplary user interface 300, expanded "Spending Money" account 320 informs the user that the balance in the account is $2000.00, there is no minimum balance for the account, there is no interest paid on the account, and the last transaction for the account was on Jan. 1, 2007. Other accounts, such as "Vacation Savings" account 323, for example, may have a different minimum balance or different interest rate, as shown in FIG. 3. In general, according to various known methods in the financial industry, short-term deposits with lower minimum balances may have lower yields, whereas long-term deposits with higher minimum balances may have higher yields, which may be reflected in the user's accounts. Also, credit or loan accounts, such as "Visa" account 329 or "Home Equity" account 331, may display credit limits, lines of credit, or potential loans available to the user, as shown in FIG. 3.

Other accounts may be expanded in the user interface to reveal information associated with portions, constituent parts, or other aspects of the account. For example, in exemplary user interface 300, "My CDs" account 326 is displayed expanded to show information associated with two CDs held in the account, each of which in turn is displayed expanded to reveal information associated with each individual CD, such as balance, interest rate, and maturity date. An investment account may also be displayed expanded to show information for each investment, such as individual stocks or mutual fund shares.

Other accounts may also be expanded in the user interface to display information associated with automatic payments for the account. Automatic payments may be made to or from an account. For example, expanded account information for "Cable Bill" account 338 tells the user that automatic payments are made from "Spending Money" account 320 to XYZ Cable Company on the first day of every month, and the last payment of $60.00 was made on Feb. 1, 2007.

In various exemplary embodiments, the user may initiate the performance of a financial transaction in a number of ways. Indicators may be associated with the accounts listed to allow the user to initiate a particular transaction by interacting with the indicators. An indicator may, for example, be associated with a specific action that is allowed involving the associated account, such as, without limitation, transferring money to an account, transferring money from an account, paying a bill, receiving a loan, opening a new account, establishing a direct deposit, establishing an automatic debit, deleting an account, setting an alert, setting an overdraft parameter, or any other type of transaction that can be performed involving one or more accounts.

In various exemplary embodiments, indicators may be displayed on the user interface as visual representations with which the user may interact. For example, in reference to exemplary user interface 300, the user may use a computer mouse to click on a "$" indicator associated with a first account, drag the "$" indicator to the name of a second account, and release the mouse button. Doing so may indicate that the user desires to transfer money from the first account to the second account. One example of a "$" indicator is shown in FIG. 3 as icon 342. The user may also click on a "←" indicator associated with a first account, drag the "←" indicator to the name of a second account, and release the mouse button. Doing so may indicate the reverse, i.e., that the user desires to transfer money from the second account to the first account. One example of a "←" indicator is shown in FIG. 3 as icon 343. The user may also click on a "Pay Bill" indicator associated with a first account, drag the "Pay Bill" indicator to the name of a second account within the "Bills" 316 category, and release the mouse button. Doing so may indicate that the user desires to pay a bill to the second account with money from the first account. One example of a "Pay Bill" indicator is shown in FIG. 3 as icon 344. The user may also click on a "←" indicator associated with a first account within the "Bills" category 316, drag the "←" indicator to a "Pay Bill" indicator associated with a second account, and release the mouse button. Doing so may indicate that the user desires to pay a bill to the first account with money from the second account. The user may also click on a "Extend CD" indicator associated with a particular CD. Doing so may indicate that the user desires to "roll over" the respective CD when it matures. One example of a "Extend CD" indicator is shown in FIG. 3 as icon 359. As shown in FIG. 3, the user's first CD may be set to mature on Jan. 1, 2008 and may be extended by clicking on icon 359. The user may also click on a "Increase Limit" indicator associated with, for example, a particular credit card or home equity line of credit. Doing so may indicate that the user desires to increase his or her line of credit associated with the respective account. One example of a "Increase Limit" indicator is shown in FIG. 3 as icon 360. As shown in FIG. 3, the user's Visa® credit card limit may be $6,000.00 and may be increased by clicking on icon 360. It should be noted that the user interface is not limited to the use of the specific indicators discussed in reference to exemplary user interface 300.

User interface 300 may receive this data as input and then request the user to enter information for a desired transaction, such as, for example, an amount of money to be transferred, a date for a transfer (e.g., today, tomorrow, in two weeks), the mechanism and/or process for a transfer or bill payment (e.g., debit, credit, cashier's check to be mailed), information associated with opening a new account, a date for extension of a CD, a desired amount for the increase of a credit limit, or the frequency of a direct deposit, alert, or overdraft protection. User interface 300 may also request the user to select from various options or enter additional information, such as determining whether a mortgage payment should be applied to principle, interest, and/or escrow. User interface 300 may display a text box or pop-up window on a web page wherein the user may type information for the transaction. The user's web browser may transmit the information for the transaction, as well as other data, such as data associated with the user's actions in selecting accounts listed on the user interface, to the relationship bank, which may then determine whether the transaction is valid and, if so, execute the transaction, as described above in reference to FIG. 2. The web browser on the user's computer may transmit such data to a server associated with the relationship bank via a network.

In various exemplary embodiments, associating an indicator, such as "$" indicator 342, "←" indicator 343, or "Pay Bill" indicator 344, in the manner described above may also be used to set up an automatic payment or debit schedule. For example, to establish automatic payments of an electric bill to ABC Electric Company, the user may click on "Pay Bill" indicator 344 associated with "Electric Bill" account 336, drag the indicator to "Spending Money" account 320, and release the mouse button. Also, for example, the user may click on "$" indicator 342 associated with "Spending Money" account 320, drag the indicator to "Vacation Savings" account 323, and release the mouse button. User interface 300 may then prompt the user via, for example, a text box or pop-up window on the web page, to determine whether the user would like to make one transfer or set up an automatic payments schedule for multiple transfers. If the user selects the latter, user interface 300 may request information associated with the desired automatic payments, such as, for example, date intervals for the payments (e.g., monthly, weekly) and payment amounts (e.g., in full, 50%). The user interface may allow the user to set up an automatic payment whenever an account reaches a designated threshold (e.g., balance above $10,000). The information may then be transmitted to the relationship bank for processing. The information associated with the automatic payments may be determined by the user, the relationship bank, the entity to which the payments are made, or any other entity.

In various exemplary embodiments, the relationship bank may also process a desired transaction, such as the transfer of money from one account to another, the extension of a CD, or the increase of a credit limit, to ensure that the transaction may be completed. For example, the user may request to pay a bill using a stock held in an investment account. The relationship bank may first convert the stock to cash or perform any other necessary processing before transferring money to the payee.

Also, user interface 300 may allow transfers between more than two accounts. For example, by using a computer mouse to click on three accounts according to the methods described above, a user may initiate the transfer of money between three accounts.

Also, user interface 300 may display an information tool for each account, such as icon 345 in FIG. 3, which is labeled "I." When a user clicks the computer mouse on an "I" icon, user interface 300 may display information associated with the respective account, such as, for example, the balance, interest rate, possible transactions for the account, restrictions on the account, and possible upgrades for the account. Upon clicking an "I" icon, user interface 300 may also open a pop-up window or open another web page to display information associated with the respective account and allow the user to perform any further actions. Upon moving the user's computer mouse pointer over an "I" icon, user interface 300 may also display information associated with the respective account and allow the user to perform any further actions. The user may also click on an "I" icon associated with a first account, drag the information tool to a second account, and release the mouse button. User interface 300 may then display via, for example, a pop-up window, what types of transfers are allowed from the first account to the second account.

The indicator(s) for transferring money as shown and described in reference to FIG. 3 may be tailored to the transactions that are possible for the associated account and based on restrictions and benefits associated with each account. For example, it may be possible for the user to transfer money from "Spending Money" account 320 or pay a bill with money from the account. The indicators "$" and "Pay Bill" may therefore be displayed. For "Car Loan" account 332, however, it may not be possible to transfer money from the account, or the user or relationship bank or any other entity may have placed a restriction prohibiting such transfers. As shown in FIG. 3, the indicator "$" therefore may not be displayed. Also, for "Home Equity" account 331, it may not be possible to increase the line of credit beyond $5,000.00. As shown in FIG. 3, the indicator "Increase Limit" therefore may not be displayed.

The relationship bank may notify the user when a desired funds transfer cannot be completed for whatever reason. As explained above in reference to FIG. 2, the user interface may indicate to the user that the desired transaction could not be completed and the reasons why the transaction could not be completed with a pop-up window, text box, or other notification on the web page. The relationship bank may also notify the user by another method, such as, for example, a telephone message, fax message, e-mail, text message, or instant message.

The relationship bank may also notify the user when a desired funds transfer is completed according to similar mechanisms and/or processes.

In various exemplary embodiments, exemplary user interface 300 may display with body 305 a set of indicators 346 associated with possible actions relating to the accounts listed in body 305. The indicators in set 346 may, for example, be displayed as buttons or icons displayed on a web page. In reference to FIG. 3, user interface 300 may display one or more of the following indicators: "Transfer Money" 347, "Pay Bill" 348, "Open New Account" 349, "Setup Direct Deposit" 350, "Delete Account" 351, "Set Alert" 352, and "Set Overdraft" 354. The user may operate these indicators in a manner similar to that indicated above for the "$", "←", and "Pay Bill" indicators. For example, the user may associate an indicator in set 346 with one or more accounts to perform a desired action. Each desired action will be discussed in turn. Exemplary user interface 300 may also display with body 305 and set of indicators 346 a set of user interface tools 357 to allow the user to easily interact with user interface 300. The user interface tools in set 357 may, for example, be displayed as buttons or icons displayed on a web page. In reference to FIG. 3, user interface 300 may display one or more of the following user interface tools: "New Folder" 353, "Customize" 355, and "Logout" 356. Each user interface tool will be discussed in turn as well.

Transfer Money:

In various exemplary embodiments, "Transfer Money" indicator 347 may operate similarly to other indicators displayed on user interface 300. For example, to initiate a transfer from a first account to a second account, the user may use a computer mouse to click on "Transfer Money" indicator 347, drag the icon to the name of a second account, and release the mouse button. User interface 300 may then request the first account and transfer information from the user via, for example, a pop-up window or text box on a web page. The user may also use a computer mouse to click on a first account, drag the first account to "Transfer Money" indicator 347, and release the mouse button. User interface 300 may then request the second account and transfer information from the user in a similar way.

Also, clicking on "Transfer Money" indicator 347 may temporarily change the user's computer mouse pointer to an image labeled "From." The user may then click on a desired account from which to transfer money. Doing so may temporarily change the user's computer mouse pointer to an image labeled "To." The user may then click on a desired account to which to transfer money. User interface 300 may then request transfer information from the user as described above.

Also, clicking on "Transfer Money" indicator 347 may open a drop-down menu on user interface 300 where the user may, for example, click on accounts and provide transfer information.

"Transfer Money" indicator 347 may also be used to establish automatic transfers as described above.

Pay Bill:

In various exemplary embodiments, "Pay Bill" indicator 348 may operate in a similar manner. For example, the user may initiate the payment of a bill by using a computer mouse to click on "Pay Bill" indicator 348, dragging the indicator to the name of bill payee account, such as "Electric Bill" account 336, and releasing the mouse button. User interface 300 may then request the account from which to pay the bill and transfer information associated with paying the bill. The user may also use a computer mouse to click on a first account, drag the first account to "Pay Bill" indicator 348, and release the mouse button. User interface 300 may then request the bill payee account to which to pay the bill and transfer information for paying the bill.

Also, clicking on "Pay Bill" indicator 348 may temporarily change the user's computer mouse pointer to an image labeled "From." The user may then click on a desired account from which to transfer money. Doing so may temporarily change the user's computer mouse pointer to an image labeled "To." The user may then click on a desired account to which to transfer money. User interface 300 may then request transfer information from the user as described above.

Also, clicking on "Pay Bill" indicator 348 may open a drop-down menu on user interface 300 where the user may, for example, click on accounts and provide transfer information associated with paying the bill.

"Pay Bill" indicator 348 may also be used to establish automatic bill payments as described above.

Open New Account:

In various exemplary embodiments, "Open New Account" indicator 348 may allow the user to transfer money to a new account that has not yet been created. For example, the user may use a computer mouse to click on a first account, drag the first account to "Open New Account" indicator 348, and release the mouse button. User interface 300 may then ask the user what type of account he or she wishes to open, a name for the new account, how much money to transfer to the new account from the first account, and other information associated with the desired transaction via, for example, a pop-up window, text box, drop-down menu, or web page. The relationship bank may then open the new account and transfer the desired funds from the first account as requested.

In an exemplary embodiment, when the user indicates that he or she wishes to open a new account, user interface 300 may display a list of new accounts for which the user is preapproved and allow the user to select one of the accounts from the list. For example, the user may be automatically preapproved for an "elite" or "premium" credit card whenever his or her total balance for all accounts exceeds $10,000. The relationship bank may thereby increase its business with the user by offering the user new accounts for which the user knows he or she is preapproved.

Figure 4:
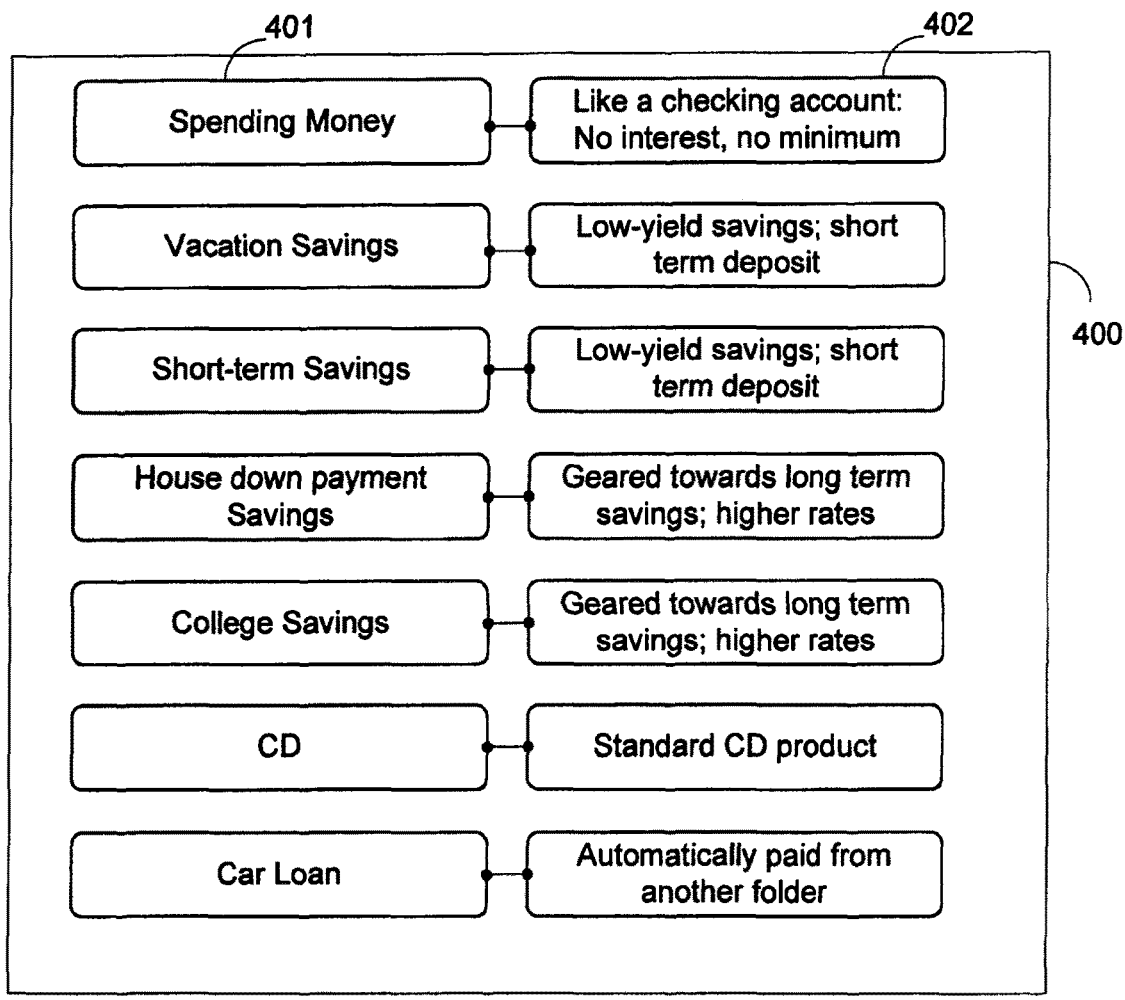
FIG. 4 depicts an exemplary user interface for selecting a new account for performing a financial transaction according to various embodiments of the disclosure.

FIG. 4 depicts an exemplary user interface 400 for selecting a new account. The relationship bank may maintain and periodically update a list of accounts for which the user is eligible. For example, the list of possible preapproved accounts may be modified as the user's credit score, payment history, or other information changes. The relationship bank may store the list in an electronic storage medium, as described above. User interface 400 may display the list of possible preapproved accounts that the user may open, such as entry 401, with associated account information that describes the features of the account, such as entry 402. The user may, for example, select a new account by clicking a computer mouse on a particular entry. User interface 400 may then return to the list of accounts as described above in reference to FIG. 3.

Setup Direct Deposit:

Referring to FIG. 3, user interface 300 may allow the user to specify how money that is deposited to the relationship bank for the user should be distributed between his or her accounts via a pop-up window, text box, web page, or other mechanism. For example, to initiate an automatic deposit into a particular account, the user may use a computer mouse to click on "Setup Direct Deposit" indicator 349, drag the indicator to the name of an account, and release the mouse button. User interface 300 may then request transfer information from the user as described above. The user may also use a computer mouse to click on an account, drag the account to "Setup Direct Deposit" indicator 349, and release the mouse button to accomplish the same.

Also, clicking on "Setup Direct Deposit" indicator 349 may open a drop-down menu on user interface 300 where the user may, for example, click on accounts and provide transfer information.

In various exemplary embodiments, user interface 300 may allow the user to select a number of accounts in which to deposit incoming money. For instance, the user may enter in a pop-up window, text box, web page, or other mechanism percentages for multiple accounts (e.g., 70% to "Spending Money" 320, 20% to "Groceries" 321, and 10% to "All-Purpose Savings" 322) or a hierarchy of selected accounts (e.g., all deposits to "Spending Money" 320 until account reaches a balance of $1000.00, then all deposits to "All-Purpose Savings" 322) or a selection based on types of deposits (e.g., all paycheck deposits to "Spending Money" 320 and all other deposits to "All-Purpose Savings" 322).

Delete Account:

In various exemplary embodiments, user interface 300 may allow the user to delete an account. For example, the user may click on "Delete Account" indicator 351, drag the indicator to an account, and release the computer mouse. The user may also click on an account, drag the account to "Delete Account" indicator 351, and release the computer mouse. The user may also click on "Delete Account" indicator 351, then click on an account to be deleted. Clicking on "Delete Account" indicator 351 may also open a drop-down menu on user interface 300 where the user may, for example, click on an account to be deleted.

To ensure that the user does not make a mistake, user interface 300 may first ask the user again via, for example, a pop-up window, whether he or she wishes to delete the account. User interface 300 may also ask the user what should be done with the money, investments, or other items in the account to be deleted. The web browser may then send data associated with the deletion request to the relationship bank and the relationship bank may delete the desired account as requested.

Set Alert:

In various exemplary embodiments, user interface 300 may also alert the user when certain events occur, which events may be specified by either the user or the relationship bank. For example, the user may click on an account with a computer mouse, drag the account to "Set Alert" indicator 352, and release the mouse button. The user may also click on "Set Alert" indicator 352, drag the indicator to an account, and release the mouse button. Clicking on "Set Alert" indicator 352 may also open a drop-down menu on user interface 300 where the user may, for example, click on an account for which to set an alert.

User interface 300 may then request various parameters for the alert, such as, for example, when the alert should occur for the account, how often the user should be alerted, and who should be alerted, via a pop-up window, text box, or web page. Notifications may be made in any number of ways, including, for example, a telephone message, fax message, e-mail, text message, or instant message. Notifications may also be sent to the user or to any other individual or entity. As just one example, the user may choose to be alerted by e-mail any time the balance of "Spending Money" account 320 falls below $100. Upon clicking on "Set Alert" indicator 352, user interface 300 may redirect the user's web browser to another web page to enter information for the desired alert.

Set Overdraft:

In various exemplary embodiments, the system and method disclosed herein may incorporate overdraft protection for the accounts listed on the user interface. This feature is particularly important when establishing automatic transfers or automatic bill payment, but may be used for any transfer of money between accounts. For example, a user may need to make sure that there are sufficient funds within an account from which an automatic bill payment is to be made on the date of the transfer. Otherwise, many banks tend to charge the user an overdraft fee. As just one example described in reference to FIG. 3, the user may do so by clicking on "Spending Money" 320, dragging the account to "Set Overdraft" indicator 305 where the user wants to place the new category or subcategory 354, then dragging the indicator to "All-Purpose Savings" 322. These actions may indicate that the user desires money to be taken from his or her savings account whenever there will be an overdraft in his or her spending money account. User interface 300 may then request from the user information associated with the overdraft protection, such as, for example, whether the specified overdraft protection should always be applied or only in certain circumstances, via a pop-up window, text box, drop-down menu, web page, or other mechanism.

The user may also select a hierarchy of selected accounts for overdraft protection. For example, the user may specify that when an overdraft is to be made from "Spending Money" 320, funds should first be transferred from "All-Purpose Savings" 322, then if there are insufficient funds in "All-Purpose Savings" 322, funds should be transferred from "Vacation Savings" 323 to make up the difference. In this way, the user is assured of never having too much money transferred from a particular account and being charged an overdraft fee. The user may do so by, for example, first clicking "Spending Money" 320, then dragging the account to "Set Overdraft" indicator 354, then dragging the indicator to "All-Purpose Savings" 322 and "Vacation Savings" 323 in turn. The user may also associate the accounts in any other manner, including those described above.

The user may set transfers even when there will not be a true overdraft. For example, the user may set overdraft protection for any time the balance of a particular account falls below a specified threshold, such as $100.

New Folder:

In various exemplary embodiments, user interface 300 may allow the user to create new categories and subcategories within body 305. The user may click on "New Folder" user interface tool 353 with a computer mouse, drag the user interface tool to the location in the list of accounts within body 305 where the user wants to place the new category or subcategory, and release the mouse button. User interface 300 may also allow the reverse, i.e., clicking on the location in the list of accounts within body 305 where the user wants to place the new category or subcategory with a computer mouse, dragging that location to "New Folder" user interface tool 353, and releasing the mouse button. Clicking on "New Folder" user interface tool 353 may also open a drop-down menu on user interface 300 where the user may select a new category or subcategory to be created. User interface 300 may also allow the user to name the new category or subcategory.

Customize:

In various exemplary embodiments, user interface 300 may allow the user to customize the features of the user interface or the displayed accounts to suit the user's preferences. Upon clicking "Customize" user interface tool 355 with a computer mouse, user interface 300 may open a new web browser window and display various options available to the user. As just some examples, the user may change the layout of items on the screen, change the color of the screen, or change the size of text and icons. The user may also make a designated account visible to another user, such as, for example, a spouse or coworker. The user may also choose to receive or not receive financial advice from the relationship bank, solicitations from the relationship bank, or solicitations from any other entity. For example, the relationship bank may periodically provide financial advice based on the user's savings goals or spending limits to the user via a pop-up window, text box, or other notification on a web page, or a telephone message, fax message, e-mail, text message, or instant message. Also, another entity may inform the user that he or she may earn rewards points by paying a bill from a designated account. The relationship bank may store data associated with the user's preferences and use that data to render a customized user interface 300 every time it is requested by the respective user and to periodically provide other information to the user as requested.

The user may also click on "Customize" user interface tool 355 with a computer mouse, drag the user interface tool to a portion or feature of user interface 300 to be customized, and release the mouse button. User interface 300 may then request details for the customization via, for example, a pop-up window. Clicking on "Customize" user interface tool 355 may also open a drop-down menu on user interface 300 where the user may select various options.

Logout:

In various exemplary embodiments, user interface 300 may allow the user to exit user interface 300. The user may, for example, click a button on a web page with a computer mouse, such as "Logout" user interface tool 356, and user interface 300 may then redirect the user's web browser to another web page. Information associated with the user may also be deleted from the user's computer prior to exiting the web browser to ensure the user's security.

It should be understood that the user interface need not use a computer mouse or any web page functionality described above in reference to FIGS. 3 and 4. It will be recognized by those in the art that other mechanisms and/or processes of receiving input from a user are available in the art. As just some examples, the user may interact with the user interface through a touch screen, touch panel, light pen, button, joystick, or any other method of interaction.

Figure 5:
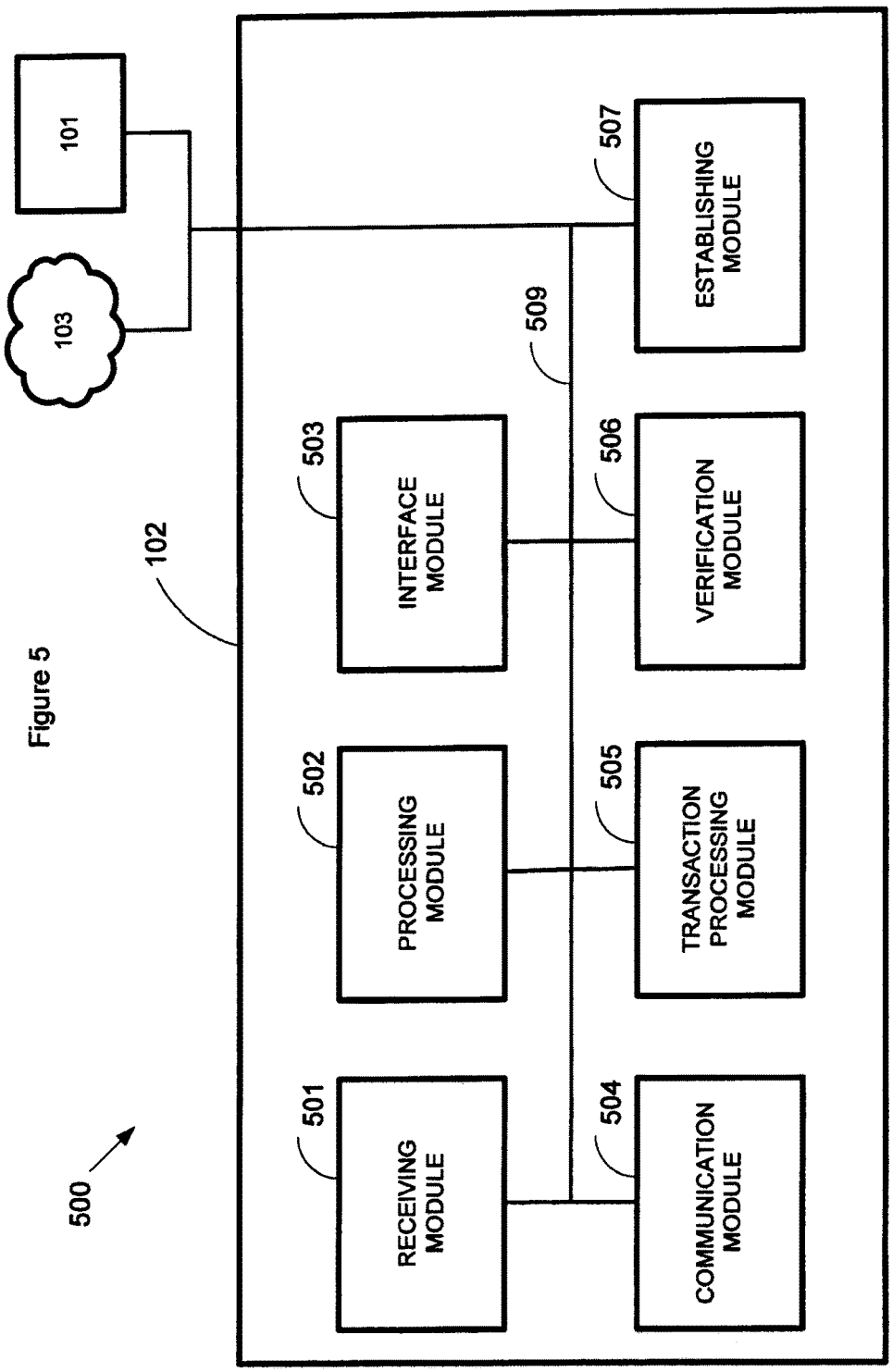
FIG. 5 depicts an exemplary system for performing a financial transaction according to various embodiments of the disclosure.

FIG. 5 depicts an exemplary system 500 for performing a financial transaction according to various embodiments of the disclosure. Relationship bank system 102 may include one or more of the following modules: receiving module 501, processing module 502, interface module 503, communication module 504, transaction processing module 505, verification module 506, and establishing module 507. One or more of the modules may communicate with each other and/or other entities, such as user system 101 and transaction processing system 103, via a communication mechanism 509, such as a data communication bus or one or more networks as defined herein. The modules may each be an appropriately programmed computer, such as a mainframe or personal computer, or may include a plurality of such computers cooperating to perform the functionality described herein. The modules may also communicate with one or more electronic storage media, as described herein.

Receiving module 501 may receive over communication mechanism 509 login information from user system 101, such as, for example, a username and password, as described herein. Processing module 502 may then retrieve data from an electronic storage medium to build a user interface for the respective user based on a master account number associated with a set of accounts that the user using user system 101 may access, as described herein. Interface module 503 may then generate data for displaying the user interface and/or provide that data to user system 101 over communication mechanism 509 so that user system 101 can display the user interface to the user, as described herein. The user interface may display, as just one example, the accounts that the user may access in a hierarchical folder-type structure such as user interface 300 in FIG. 3. Communication module 504 may receive from user system 101 over communication mechanism 509 data associated with the user's interaction with the user interface, such as, for example, data indicating that the user dragged an indicator for a funds transfer from one account to another, as described herein. Verification module 506 may then verify whether the user's desired financial transaction may be performed. For example, verification module 506 may retrieve data from an electronic storage medium to determine whether there are enough funds within a particular account for a funds transfer or to determine whether there is a restriction placed on an account by the user, the relationship bank, or any other entity that may prohibit the desired transfer. Also, if, for example, the user desires to establish a new account, establishing module 507 may open the new account as the user requested, as described herein. Transaction processing module 505 may also perform the user's desired financial transaction, such as a funds transfer between two accounts, as described herein.

Figure 6:
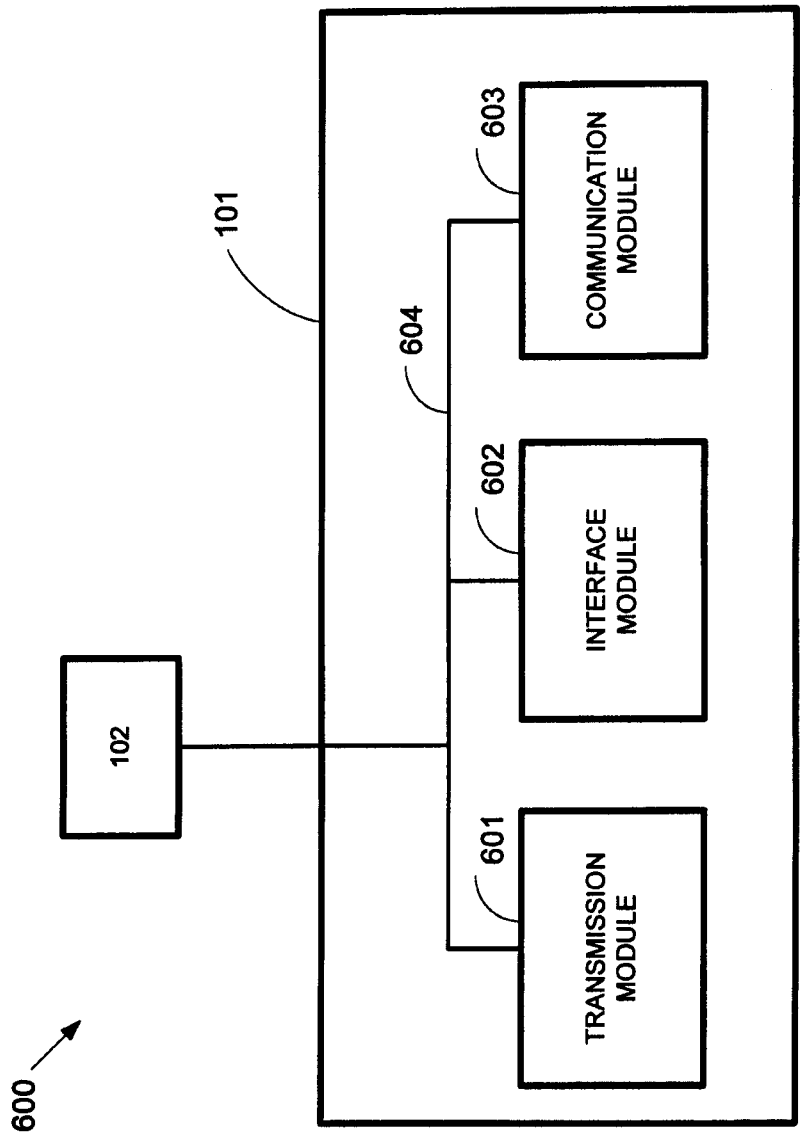
FIG. 6 depicts an exemplary system for performing a financial transaction according to various embodiments of the disclosure.

FIG. 6 depicts an exemplary system 600 for performing a financial transaction according to various embodiments of the disclosure. User system 101 may include one or more of the following modules: transmission module 601, interface module 602, and communication module 603. One or more of the modules may communicate with each other and/or other entities, such as relationship bank system 102, via a communication mechanism 604, such as a data communication bus or one or more networks as defined herein. The modules may each be an appropriately programmed computer, such as a mainframe or personal computer, or may include a plurality of such computers cooperating to perform the functionality described herein. The modules may also communicate with one or more electronic storage media, as described herein.

Transmission module 601 may transmit over communication mechanism 604 login information to relationship bank system 102, such as, for example, a username and password, as described herein. Interface module 602 may then receive data for the user interface from relationship bank system 102 and/or display the user interface to the user, as described herein. The user interface may display, as just one example, a set of accounts that the user may access in a hierarchical folder-type structure such as user interface 300 in FIG. 3. Communication module 603 may then transmit to relationship bank system 102 over communication mechanism 604 data associated with the user's interaction with the user interface, such as, for example, data indicating that the user dragged an indicator for a funds transfer from one account to another, as described herein. Relationship bank system 102 may then perform the financial transaction requested by the user, as described herein.

The present invention encourages a user to open accounts or maintain accounts at a relationship bank that provides the functionality described herein. By providing a convenient, easy-to-use user interface for its users to access accounts and perform financial transactions with those accounts from multiple devices and locations, the relationship bank may increase its business with existing customers and gain new customers. The present invention may also provide additional security because a user may refer to a set of accounts with a master account number or account names rather than multiple account numbers, which may be stolen or lost.

The embodiments of the present invention are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A system comprising:
    a receiver that receives identifying information from a device associated with a user, the identifying information associated with a single master account number, the single master account number comprising a predetermined sequence of letters, numbers, or characters;
    a first processor that determines based on the identifying information associated with the single master account number a plurality of accounts to which the user has access, the plurality of accounts comprising a first account and a second account;
    a user interface processor that provides data to generate a user-customized dynamic display on the device associated with the user, wherein the data is associated with a previous user interaction with the user-customized dynamic display, which generates an indicator associated with a financial transaction, wherein the user-customized dynamic display is generated based on the previous user interaction data and automatically updates based on changes in user information and user interactions, and wherein the user-customized dynamic display comprises a list of the plurality of accounts and is configured to selectively display at least one of the first and second accounts based on frequency of the user interactions;
    a communication module that:
        receives information reflecting that the user requested a financial transaction between the first account and the second account, including transferring funds between the first and second accounts, by dragging and dropping the indicator from the first account to the second account located within the user-customized dynamic display, and
        receives terms for the financial transaction between the first account and the second account; and
    a second processor that initiates performance of the financial transaction with respect to the first account and the second account according to the received terms, wherein the communications module generates a recommendation of one or more alternative transactions to the user if the financial transaction cannot be performed according to the received terms, wherein the one or more alternative transactions are based at least in part on the financial transaction, wherein the communication module transmits the recommendation to the user interface processor which generates a notification of the recommendation via the user-customized dynamic display, and wherein the financial transaction is stored as previous user interaction data in the user interface processor when the transaction can be performed according to the received terms and the alternative financial transaction is stored as previous user interaction data when the transaction cannot be performed according to the received terms; and
    a third processor configured to establish a connection with the second processor when the financial transaction cannot be performed according to the received terms, and the third processor further configured to:
        receive, from the second processor, data associated with the financial transaction;
        initiate, based on the received data associated with the financial transaction, performance of the financial transaction with respect to the first account and the second account according to the received terms; and
        transmit a response to the second processor, the response indicating whether the financial transaction was completed,
    wherein the user interface processor is configured to generate another notification indicating reasons why the financial transaction cannot be performed by the second or third processor according to the received terms via the user-customized dynamic display.

2. The system of claim 1, wherein the user requested the financial transaction by dragging and dropping a visual icon within the user-customized dynamic display.

3. The system of claim 1, wherein the list comprises account icons associated with the plurality of accounts.

4. The system of claim 1, wherein the financial transaction is one of transferring funds between accounts, paying a bill, opening a new account, establishing a direct deposit, establishing an automatic debit, deleting an account, setting an alert, or setting an overdraft parameter.

5. The system of claim 1, wherein:
the financial transaction is transferring funds between accounts;
receiving terms for the financial transaction comprises receiving terms for a funds transfer from the first account to the second account; and
performing the financial transaction comprises transferring funds from the first account to the second account.

6. The system of claim 5, further comprising a verification module operable to verify that there are sufficient funds in the first account for the funds transfer.

7. The system of claim 5, further comprising a verification module operable to verify that the funds transfer is permitted by a predetermined rule.

8. The system of claim 5, further comprising an establishing module to establish the second account prior to transferring funds from the first account to the second account.

9. The system of claim 5, wherein the first account belongs to the user and the second account belongs to an entity other than the user.

10. The system of claim 5, wherein the step of transferring is performed automatically at a predetermined interval.

11. A computer-implemented method comprising:
receiving, at a relationship server, identifying information from a device associated with a user;
determining, using the relationship server, based on the identifying information a plurality of accounts to which the user has access, the plurality of accounts comprising a first account and a second account;
providing, from the relationship server, data to generate a user-customized dynamic display on the device associated with the user, wherein the data is associated with a previous user interaction with the user-customized dynamic display, which generates an indicator associated with a financial transaction, wherein the user-customized dynamic display is generated based on the previous user interaction data and automatically updates based on changes in user information and user interactions, and wherein the user-customized dynamic display comprises a list of the plurality of accounts;
receiving, at the relationship server, information reflecting that the user requested a financial transaction between the first account and the second account, such that moving funds to at least one of the accounts by selecting the indicator within the user-customized dynamic display causes a pointer of the device associated with the user to temporarily change to an image, and receiving terms for the financial transaction between the first account and the second account;
using a first computer processor, initiating performance of the financial transaction with respect to the first account and the second account according to the received terms;
generating a recommendation, using the relationship server, of one or more alternative transactions to the user if the financial transaction cannot be performed according to the received terms, wherein the one or more alternative transactions are based at least in part on the financial transaction, wherein the relationship server generates a notification of the recommendation via the user-customized dynamic display;
storing, at the relationship server, the financial transaction as previous user interaction data when the transaction can be performed according to the received terms, and the alternative financial transaction as previous user interaction data when the transaction cannot be performed according to the received terms;
establishing, via one or more networks, a connection with a second processor when the financial transaction cannot be performed according to the received terms, the second processor configured to:
receive, from the first processor, data associated with the financial transaction;
initiate, based on the received data associated with the financial transaction, performance of the financial transaction with respect to the first account and the second account according to the received terms; and
transmit a response to the first processor, the response indicating whether the financial transaction was completed,
wherein the relationship server is configured to generate another notification indicating reasons why the financial transaction cannot be performed by the first or second processor according to the received terms via the user-customized dynamic display.

12. The method of claim 11, wherein the user requested the financial transaction by dragging and dropping a visual icon within the user-customized dynamic display.

13. The method of claim 11, wherein the list comprises account icons associated with the plurality of accounts.

14. The method of claim 11, wherein the financial transaction is one of transferring funds between accounts, paying a bill, opening a new account, establishing a direct deposit, establishing an automatic debit, deleting an account, setting an alert, or setting an overdraft parameter.

15. The method of claim 11, wherein:
the financial transaction is transferring funds between accounts;
receiving terms for the financial transaction comprises receiving terms for a funds transfer from the first account to the second account; and
performing the financial transaction comprises transferring funds from the first account to the second account.

16. The method of claim 15, further comprising:
verifying that there are sufficient funds in the first account for the funds transfer.

17. The method of claim 15, further comprising:
verifying that the funds transfer is permitted by a predetermined rule.

18. The method of claim 15, further comprising:
establishing the second account prior to transferring funds from the first account to the second account.

19. The method of claim 15, wherein the first account belongs to the user and the second account belongs to an entity other than the user.

20. A non-transitory computer-accessible medium encoded with computer program code effective to perform the following:
receive, at a first relationship server, identifying information from a device associated with a user, the identifying information associated with a single master account number, the single master account number comprising a predetermined sequence of letters, numbers, or characters;
determine, using the first relationship server, based on the identifying information associated with the single master account number a plurality of accounts to which the user has access, the plurality of accounts comprising a first account and a second account;
provide, from the first relationship server, data to generate a user-customized dynamic display on the device associated with the user, wherein the data is associated with a previous user interaction with the user-customized dynamic display, which generates an indicator associated with a financial transaction, wherein the user-customized dynamic display is generated based on the previous user interaction data and automatically updates based on changes in user information and user interactions, and wherein the user-customized dynamic display comprises a list of the plurality of accounts and is configured to selectively display at least one of the first and second accounts based on frequency of user interactions;

receive, at the first relationship server, information reflecting that the user requested a financial transaction between the first account and the second account, including transferring funds between the first and second accounts, by dragging and dropping the indicator from the first account to the second account located within the user-customized dynamic display;

receive, at the first relationship server, terms for the financial transaction between the first account and the second account;

initiate, using the first relationship server, performance of the financial transaction with respect to the first account and the second account according to the received terms;

generate a recommendation, using the first relationship server, one or more alternative transactions to the user if the financial transaction cannot be performed according to the received terms, wherein the one or more alternative transactions are based at least in part on the financial transaction, and wherein the first relationship server generates a notification of the recommendation via the user-customized dynamic display;

store, at the first relationship server, the financial transaction as previous user interaction data when the transaction can be performed according to the received terms, and the alternative financial transaction as previous user interaction data when the transaction cannot be performed according to the received terms;

establish, via one or more networks, a connection with a second relationship server when the financial transaction cannot be performed according to the received terms, the second relationship configured to:
  receive, from the first relationship server, data associated with the financial transaction;
  initiate, based on the received data associated with the financial transaction, performance of the financial transaction with respect to the first account and the second account according to the received terms; and
  transmit a response to the first relationship server, the response indicating whether the financial transaction was completed, wherein the first relationship server is configured to generate another notification indicating reasons why the financial transaction cannot be performed by the first or second relationship server according to the received terms via the user-customized dynamic display.

21. The system of claim 1, wherein the first processor and the second processor are the same.

* * * * *